(12) United States Patent
Guo et al.

(10) Patent No.: US 9,344,964 B2
(45) Date of Patent: May 17, 2016

(54) METHOD AND APPARATUS TO INDICATE PPI (POWER PREFERENCE INDICATION) IN A WIRELESS COMMUNICATION SYSTEM

(71) Applicant: INNOVATIVE SONIC CORPORATION, Taipei (TW)

(72) Inventors: Yu-Hsuan Guo, Taipei (TW); Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 89 days.

(21) Appl. No.: 14/023,770

(22) Filed: Sep. 11, 2013

(65) Prior Publication Data

US 2014/0071872 A1 Mar. 13, 2014

Related U.S. Application Data

(60) Provisional application No. 61/699,428, filed on Sep. 11, 2012.

(51) Int. Cl.
*H04W 52/02* (2009.01)

(52) U.S. Cl.
CPC ...... *H04W 52/0209* (2013.01); *H04W 52/0222* (2013.01); *H04W 52/0235* (2013.01); *H04W 52/0261* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2011/0087761 A1 | 4/2011 | Fong | |
| 2012/0322515 A1* | 12/2012 | Hwang et al. | 455/574 |
| 2013/0083713 A1* | 4/2013 | Johansson et al. | 370/311 |
| 2013/0301500 A1* | 11/2013 | Koc et al. | 370/311 |
| 2013/0308513 A1* | 11/2013 | Jheng et al. | 370/311 |
| 2014/0018085 A1* | 1/2014 | Young et al. | 455/450 |
| 2014/0036794 A1* | 2/2014 | Koc | H04W 24/04 370/329 |
| 2014/0044029 A1* | 2/2014 | Chou et al. | 370/311 |
| 2015/0195753 A1* | 7/2015 | Jung | H04W 36/0055 370/331 |
| 2015/0201375 A1* | 7/2015 | Vannithamby | H04W 24/04 370/311 |

OTHER PUBLICATIONS

3GPP TSG-RAN WG2 Meeting#79 Aug. 13-17, 2012, Qingdao, P.R. China.
3GPP TSG-RAN#79 Aug. 13-17, 2012, Qingdao, P.R. China.
TSG-RAN Working Group 2 Meeting #79bis Bratislava, Slovakia, Oct. 8-12, 2012.
Search Report on corresponding EP Patent Application No. 13183931.8 dated Apr. 15, 2014.
Office Action on corresponding JP Patent Application No. 2013-187415 dated Jul. 1, 2014.
Office Action on corresponding KR Patent Application No. 10-2013-0109080 dated Aug. 26, 2014.
Draft Report of 3GPP TSG-RAN WG2 Meeting#79bis, held in Bratislava, Slocakia, Oct. 8-12, 2012.
Office Action on corresponding foreign application (TW102132728) from TIPO dated Nov. 19, 2014.

* cited by examiner

*Primary Examiner* — Min Jung
(74) *Attorney, Agent, or Firm* — Blue Capital Law Firm, P.C.

(57) ABSTRACT

A method and apparatus are disclosed to indicate PPI in a wireless communication network. The method includes enabling a PPI feature. The method further includes taking a last reported PPI into account when the UE wants to indicate a current PPI for a first time on a current serving cell but not a first time since a full configuration was performed. The method further includes ignoring or not taking into account the last reported PPI when the UE wants to indicate the current PPI for a first time since a full configuration was performed.

12 Claims, 6 Drawing Sheets

METHOD AND APPARATUS TO INDICATE PPI (POWER PREFERENCE INDICATION) IN A WIRELESS COMMUNICATION SYSTEM

CROSS-REFERENCE TO RELATED APPLICATIONS

The present Application claims the benefit of U.S. Provisional Patent Application Ser. No. 61/699,428 filed on Sep. 11, 2012, the entire disclosure of which is incorporated herein by reference.

FIELD

This disclosure generally relates to wireless communication networks, and more particularly, to a method and apparatus to indicate PPI in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to indicate PPI in a wireless communication network. The method includes enabling a PPI feature. The method further includes taking a last reported PPI into account when the UE wants to indicate a current PPI for a first time on a current serving cell but not a first time since a full configuration was performed. The method further includes ignoring or not taking into account the last reported PPI when the UE wants to indicate the current PPI for a first time since a full configuration was performed.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. 3GPP TS 36.331 V10.5.0, "E-UTRA RRC protocol specification (Release 10)"; 3GPP TS 36.331 V11.0.0, "E-UTRA RRC protocol specification (Release 11)"; and R2-124364, "Introduction of 'Power preference indication'", ZTE Corporation. The standards and documents listed above are hereby expressly incorporated herein.

Figure 1:
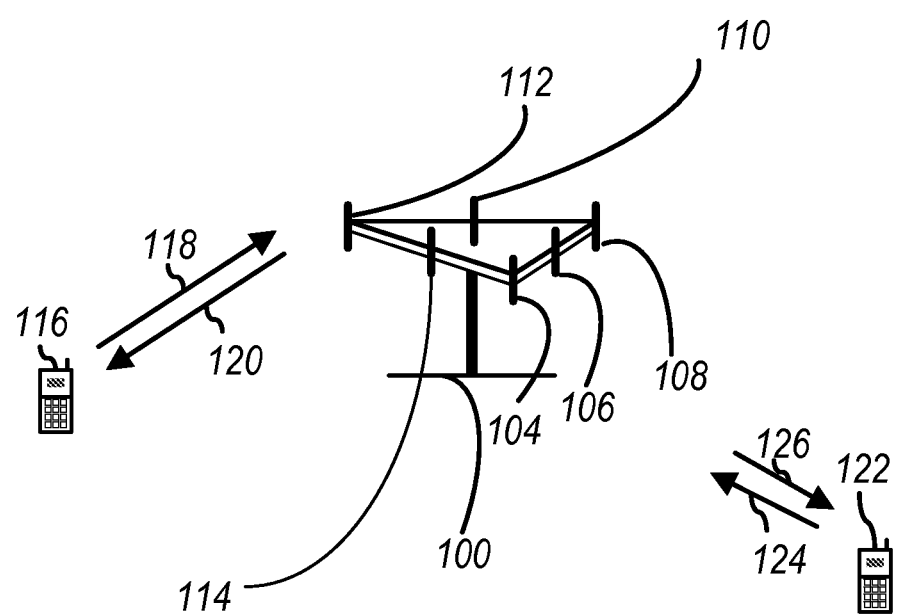
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
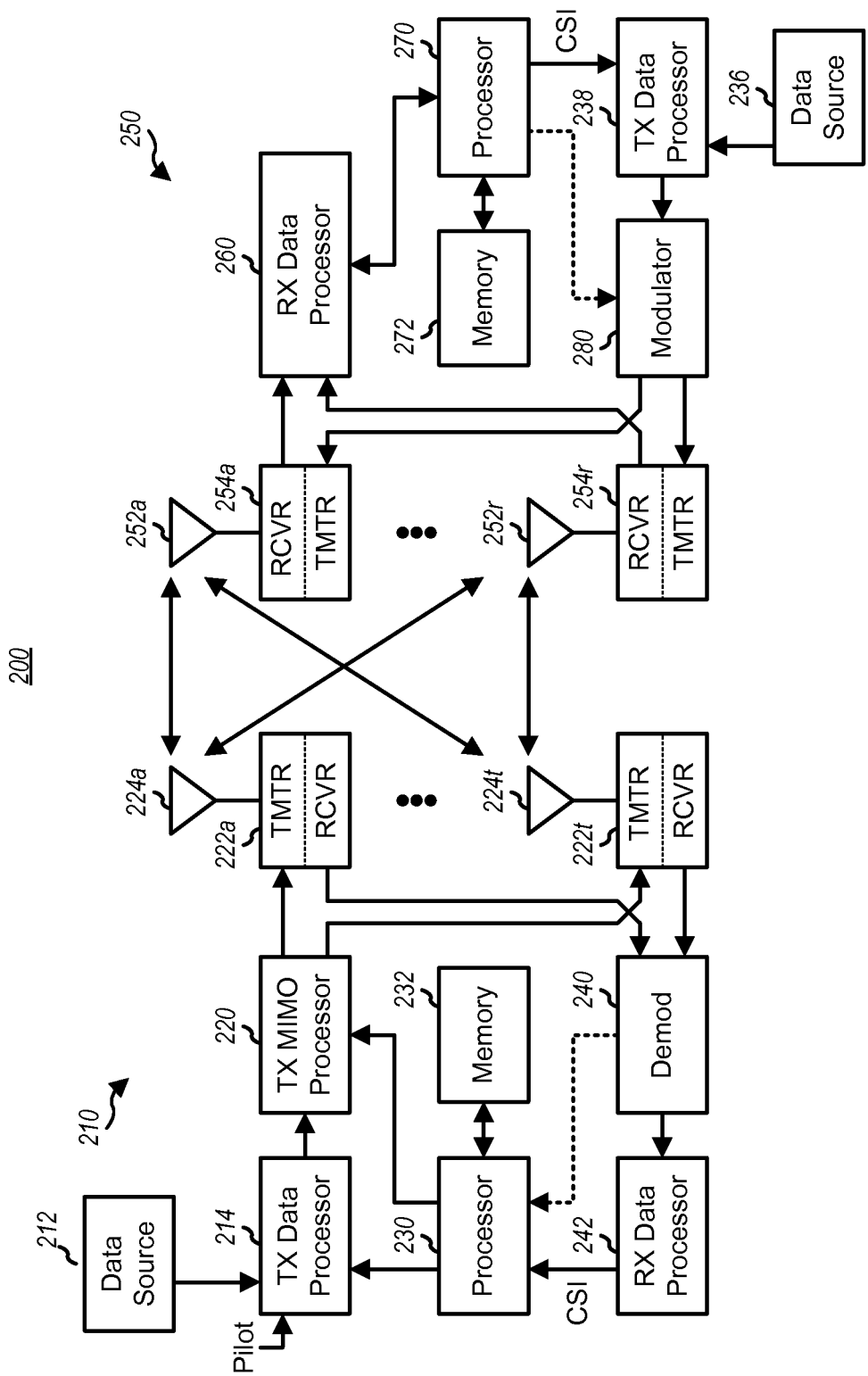
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
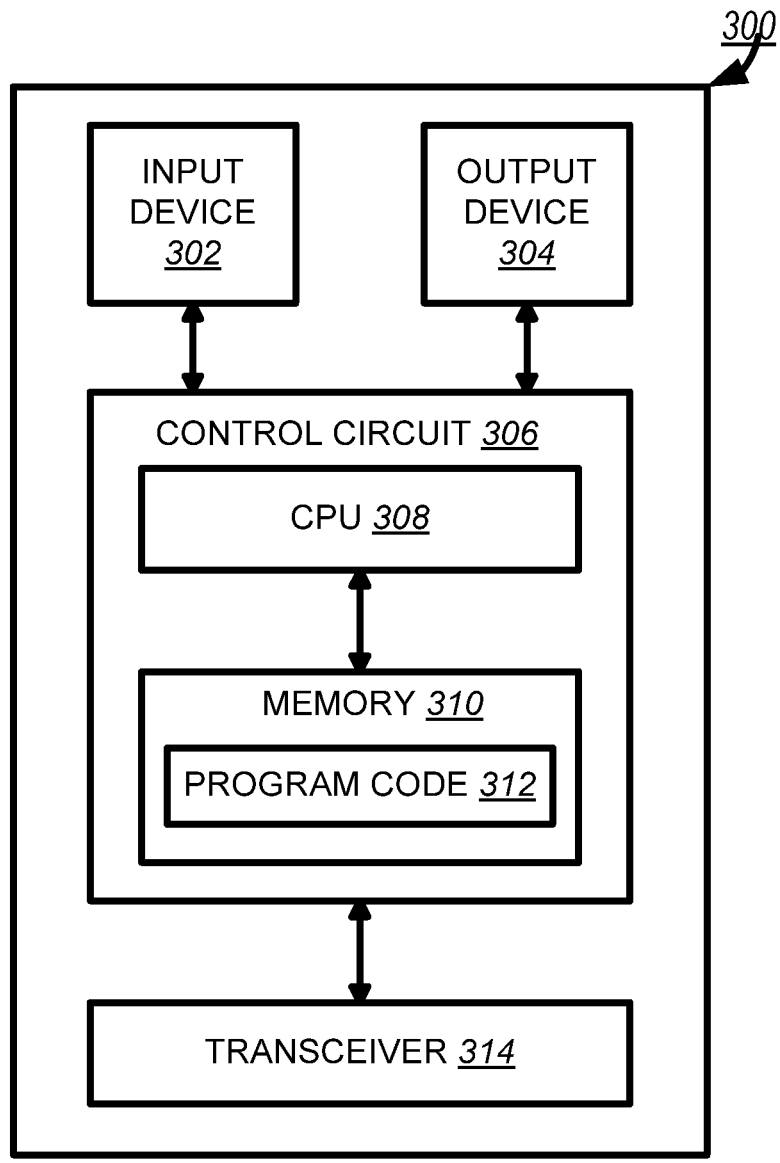
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
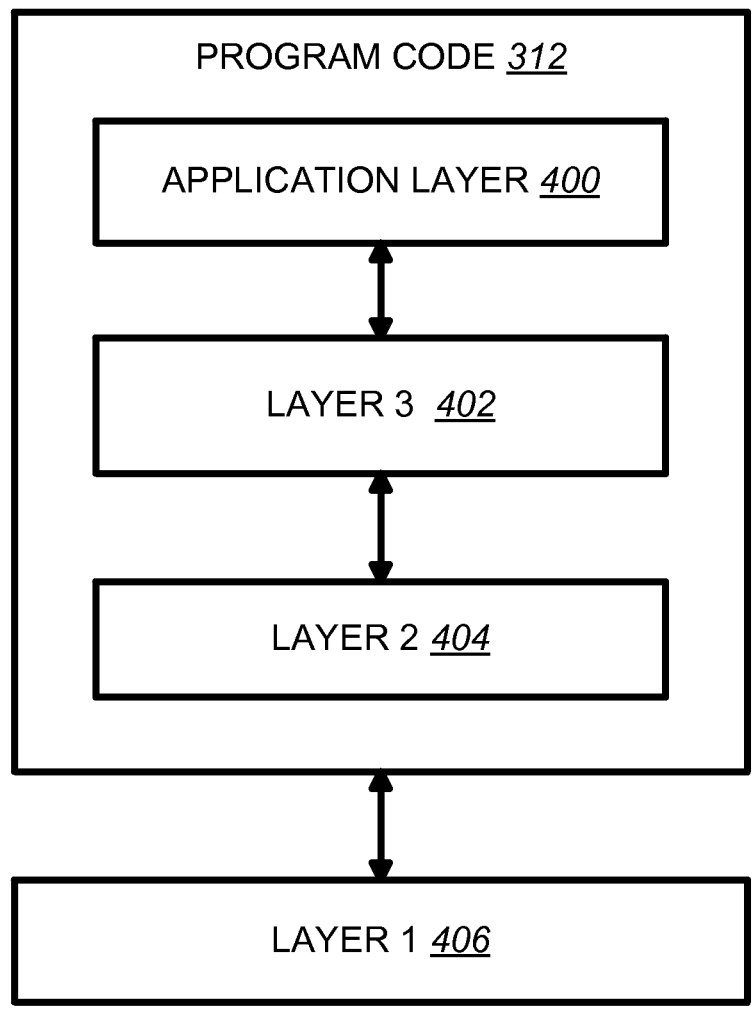
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

A Change Request for 3GPP TS 36.331 V11.0.0 for EDDA (Enhancements for Diverse Data Applications) has been agreed in R2-124364 as the outcome of E-mail discussion [79#14] and will be presented in 3GPP RAN #57 meeting for approval. R2-124364 proposes a procedure for a UE (User Equipment) to inform the E-UTRAN (Evolved Universal Terrestrial Radio Access Network) of the UE's power saving preference as follows:

5.3.15.1 General

Figure 6:
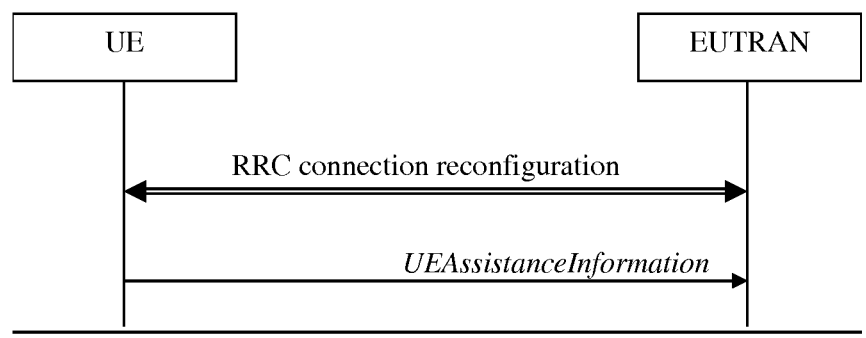
FIG. 6 is a reproduction of FIG. 5.3.15.1-1 of 3GPP R2-124364.

As shown in FIG. 6, the purpose of this procedure is to inform E-UTRAN of the UE's power saving preference. E-UTRAN may assume that the UE prefers a default configuration for power saving initially when it configures and enables the UE for power preference indication.

5.3.15.2 Initiation

A UE capable of providing power preference indications in RRC_CONNECTED may initiate the procedure only if:

1> the received powerPrefIndicationConfig includes the powerPrefIndication-Enabled; and 1> the UE did not indicate any power saving preference since last entering RRC_CONNECTED on the current Pcell, or the current UE preference is different from the one indicated in the last transmission of the UEAssistanceInformation message to the current Pcell; and
1> timer T340 is not running.
Editor's Note: It is FFS whether the first transmission of the powerPrefIndication is restricted so that it can only be set to lowpowerconsumption.
Upon initiating the procedure, the UE shall:
   1> if the UE prefers a default configuration for power saving:
      2> start timer T340 with the timer value set to the powerPrefIndication-Timer;
   1> initiate transmission of the UEAssistanceInformation message in accordance with 5.3.15.3;
Editor's Note: It is FFS whether T340 is started also in case where the UE prefers a configuration that is primarily optimized for power saving.
5.3.15.3 Actions Related to Transmission of UEAssistanceInformation Message
The UE shall set the contents of UEAssistanceInformation message as follows:
   1> if the UE prefers a default configuration for power saving:
      2>set powerPrefIndication to default;
   1> else if the UE prefers a configuration primarily optimised for power saving:
      2> set powerPrefIndication to lowpowerconsumption;
The UE shall submit the UEAssistanceInformation message to lower layers for transmission.
Furthermore, 3GPP TS 36.331 V10.5.0 defines the structure of the information element as follows:
6.3.6 Other Information Elements
   OtherConfig
The IE OtherConfig Contains Configuration Related to other Configuration

| powerPrefIndication-Timer |
| --- |
| Prohibit timer for Power Preference Indication reporting. Value in seconds. Value s0 means prohibit timer is set to 0 second or not set, value s0dot5 means prohibit timer is set to 0.5 second, value s1 means prohibit timer is set to 1 second and so on. |

| Conditional presence | Explanation |
| --- | --- |
| ppiENABLED | The field is mandatory present in case powerPrefIndication-Enabled is present; otherwise the field is not present. |

Currently, a UE may indicate (or report) its PPI (Power Preference Indication) if the UE has not indicated (or reported) any PPI on the current Pcell (Primary Cell). However, it has been proposed that the information of UE's PPI should be transferred from source eNB to target eNB during handover preparation (for example, via HandoverPreparationInformation message). If the PPI information has been transferred between eNBs, it does not seem necessary for the UE to indicate (or report) its PPI after handover if the UE has not changed its preference.

On the other hand, the information of PPI could only be transferred between eNBs supporting the PPI feature. If the target eNB does not support the feature of PPI, the target eNB would not recognize the PPI information from the source eNB, and would not forward the PPI information to the next target eNB. In this case, the UE should still indicate (or report) its PPI to the eNB regardless of whether the UE has changed its preference or not.

In addition, it was agreed that an eNB would not indicate its support of PPI. Instead, an eNB would indicate whether the

| OtherConfig information element |
| --- |
| ```
-- ASN1START
OtherConfig-r9 ::= SEQUENCE {
    reportProximityConfig-r9        ReportProximityConfig-r9       OPTIONAL,    -- Need ON
    ...,
    [[ powerPrefIndicationConfig-r11    PowerPrefIndicationConfig-r11  OPTIONAL,    -- Need ON
    ]]
}
ReportProximityConfig-r9 ::= SEQUENCE {
    proximityIndicationEUTRA-r9     ENUMERATED {enabled}           OPTIONAL,    -- Need OR
    proximityIndicationUTRA-r9      ENUMERATED {enabled}           OPTIONAL     -- Need OR
}
PowerPrefIndicationConfig-r11 ::= SEQUENCE {
    PowerPrefIndication-Enabled-r11     ENUMERATED {enabled} OPTIONAL,   -- Need OR
    PowerPrefIndication-Timer-r11       ENUMERATED {
        s0, s0dot5, s1, s2, s5, s10, s20, s30, s60, s90, s120, s300, s600, spare3, spare2, spare1}
}
ppiENABLED                                              OPTIONAL,    -- Cond
-- ASN1STOP
``` |

| OtherConfig field descriptions |
| --- |
| reportProximityConfig |
| Indicates, for each of the applicable RATs (EUTRA, UTRA), whether or not proximity indication is enabled for CSG member cell(s) of the concerned RAT. Note. |
| powerPrefIndication-Enabled |
| The field is used to indicate whether Power Preference Indication reporting from the UE is allowed or not. |

PPI feature has been enabled or not. However, disabling PPI does not mean the eNB does not support the feature. Assuming that the PPI feature is supported and is disabled, the eNB would still transfer the PPI information. In this scenario, a UE would not know whether the target eNB has knowledge of UE's PPI based on whether the PPI feature is enabled or not. Under the circumstances, other methods need to be studied to avoid redundant UE transmissions of PPI.

As discussed in R2-124364, the IE powerPrefIndication-Config-r11 is set to Need ON (i.e., no action should be done when the IE is absent). When the source eNB has enabled the PPI feature, there may be three possible cases for the target eNB (upon handover) as follows:

Case 1—If the target eNB supports the PPI feature and would like to continue enabling the PPI feature, the IE powerPrefIndicationConfig-r11 would be absent in the handover message.

Case 2—If the target eNB supports the PPI feature and would like to disable the PPI feature, the IE powerPrefIndicationConfig-r11 would be included in the handover message to disable the PPI feature.

Case 3—If the target eNB does not support the PPI feature, it would be assumed that full configuration should be used and the IE powerPrefIndicationConfig-r11 would be absent in the handover message so that the PPI configuration would be released.

In cases 1 and 2, it is assumed that the target eNB knows the PPI information forwarded from the source eNB. While in the case 3, it is assumed that the target eNB does not know the PPI information forwarded from the source eNB. Therefore, it seems that after full-configuration, the PPI information would be lost on the eNB side. In one embodiment, the general concept of the invention is that a UE could decide whether or not the PPI transmission should take the last reported value into account based on information related to whether the PPI information is known or lost on the eNB side, i.e., determined by whether full configuration is performed or not.

Figure 5:
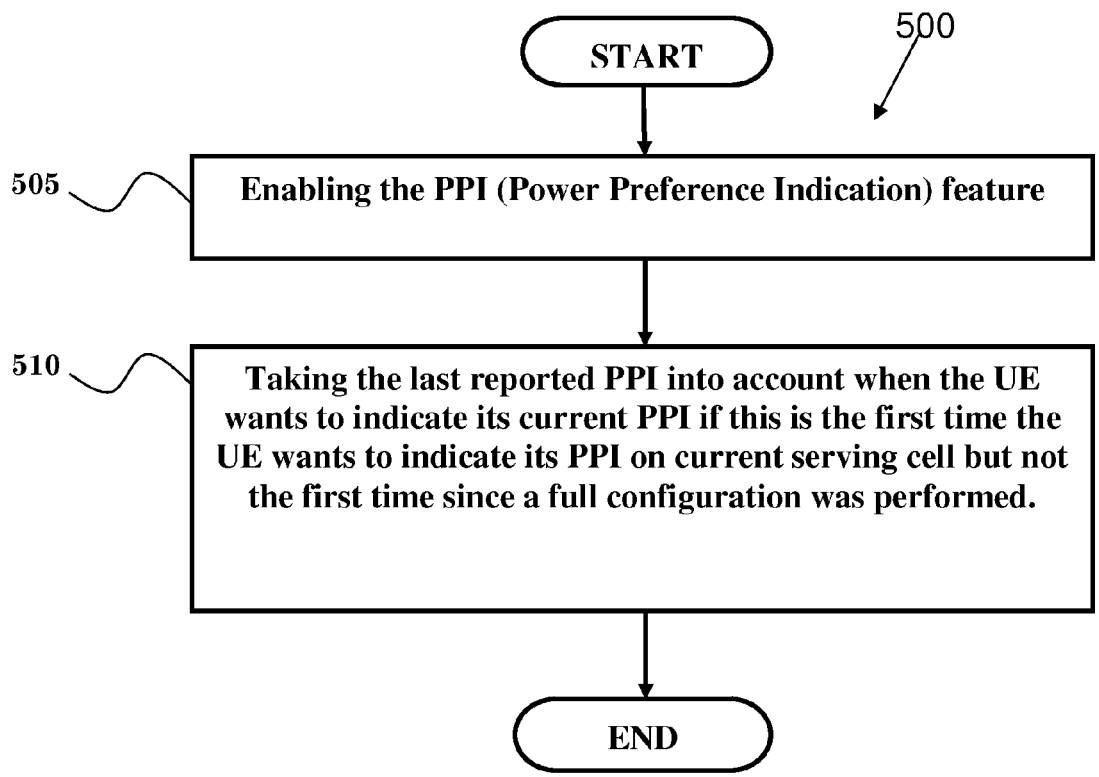
FIG. 5 is a flow chart according to one exemplary embodiment.

FIG. 5 is a flow chart 500 in accordance with one exemplary embodiment. In step 505, the PPI feature is enabled. In step 510, the last reported PPI is taken into account when the UE wants to indicate (or report) its current PPI if this is the first time the UE wants to indicate (or report) its current PPI on current serving cell but not the first time since a full configuration was performed. Taking the last reported PPI into account means ensuring that the value of the current PPI should be different from the value of the last reported PPI. In other words, taking the last reported PPI into account means ensuring that the value of the current PPI cannot be the same as the value of the last reported PPI. In one embodiment, the current PPI is not the PPI that was first reported since the UE last entered RRC_CONNECTED. Furthermore, the current serving cell is PCell (Primary Cell).

In one embodiment, the PPI feature could be enabled through an RRCConnectionReconfiguration message. More specifically, the PPI feature could be enabled if a powerPrefIndication-Enabled-r11 IE (Information Element) is present or is set to TRUE in the RRCConnectionReconfiguration message. Furthermore, the full configuration would be performed upon receiving an RRCConnectionReconfiguration message that indicates that a full configuration should be applied (e.g., by including a fullConfig-r9 IE). Also, upon performing the full configuration, a current configuration of power preference indication would be released before applying a new configuration. Moreover, the RRCConnectionReconfiguration message is used to handover the UE.

In another embodiment, when the UE wants to indicate (or report) its current PPI and this is the first time the UE wants to indicate (or report) its current PPI since a full configuration was performed, the current PPI is reported without taking the last reported PPI into account. The value of the current PPI is not "default" nor used to indicate the preference for a default configuration for power saving. The value of the current PPI could be "lowpowerconsumption" or used to indicate the preference primarily optimized for power saving. Alternatively, the value of the current PPI could be the same as the value of the last reported PPI.

Referring back to FIGS. 3 and 4, in one embodiment, the device 300 includes a program code 312 stored in memory 310. In one embodiment, the CPU 308 could execute the program code 312 (i) to enable the PPI feature, and (ii) to take the last reported PPI into account when the UE wants to indicate its current PPI for the first time on a current serving cell but not the first time since a full configuration was performed. Furthermore, the CPU 308 could execute the program code 312 to ignore or not take into account the last reported PPI when the UE wants to indicate a current PPI for a first time since a full configuration was performed. In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method implemented in a UE (User Equipment) for reporting a PPI (Power Preference Indication) which is used to indicate whether the UE prefers a configuration primarily optimized for power saving or not, comprising:
   receiving, at the UE, an RRCConnectionReconfiguration message to enable PPI reporting;
   reporting, by the UE, the PPI if the PPI is to be reported for a first time on a current serving cell but not for a first time since a full configuration was performed and if a current value of the PPI is different from a last reported value of the PPI;
   not reporting, by the UE, the PPI if the PPI is to be reported for a first time on the current serving cell but not for a first time since the full configuration was performed and if the current value of the PPI is the same as the last reported value of the PPI; and
   reporting, by the UE, the PPI, regardless of the last reported value of the PPI, if the PPI is to be reported for a first time since the full configuration was performed.

2. The method of claim 1, wherein the PPI is included in an UEAssistanceInformation message.

3. The method of claim 1, wherein the PPI is not a first reported PPI since the UE entered into RRC_CONNECTED.

4. The method of claim 1, wherein the current serving cell is PCell (Primary Cell).

5. The method of claim 1, wherein the full configuration is performed upon receiving an RRCConnectionReconfiguration message indicating that the full configuration should be performed.

6. The method of claim 1, wherein upon performing the full configuration, a current configuration of the PPI is released before applying a new configuration.

7. A UE (User Equipment) for reporting a PPI (Power Preference Indication) which is used to indicate whether the UE prefers a configuration primarily optimized for power saving or not in a wireless communications system, the UE comprising:
   a control circuit;
   a processor installed in the control circuit;
   a memory installed in the control circuit and operatively coupled to the processor;
   wherein the processor is configured to execute a program code stored in the memory to:
      receive an RRCConnectionReconfiguration message to enable PPI reporting;
      report the PPI if the PPI is to be reported for a first time on a current serving cell but not for a first time since a full configuration was performed and if a current value of the PPI is different from a last reported value of the PPI;
      not report the PPI if the PPI is to be reported for a first time on the current serving cell but not for a first time since the full configuration was performed and if the current value of the PPI is the same as the last reported value of the PPI; and
      report the PPI, regardless of the last reported value of the PPI, if the PPI is to be reported for a first time since the full configuration was performed.

8. The UE of claim 7, wherein the PPI is included in an UEAssistanceInformation message.

9. The UE of claim 7, wherein the PPI is not a first reported PPI since the UE entered into RRC_CONNECTED.

10. The UE of claim 7, wherein the current serving cell is PCell (Primary Cell).

11. The UE of claim 7, wherein the full configuration is performed upon receiving an RRCConnectionReconfiguration message indicating that the full configuration should be performed.

12. The UE of claim 7, wherein upon performing the full configuration, a current configuration of the PPI is released before applying a new configuration.

* * * * *